United States Patent [19]
Kleiner et al.

[11] 3,812,222
[45] May 21, 1974

[54] PROCESS FOR THE MANUFACTURE OF ALKANE PHOSPHONIC ACID DIESTERS

[75] Inventors: Hans-Jerg Kleiner, Bad Soden/Taunus; Siegbert Rittner, Frankfurt am Main, both of Germany

[73] Assignee: Farbwerke Hoechst Aktiengesellschaft vormals Meister Lucius & Bruning, Frankfurt am Main, Germany

[22] Filed: Dec. 14, 1970

[21] Appl. No.: 98,052

[30] Foreign Application Priority Data
Dec. 16, 1969 Germany............................ 1963014
Sept. 2, 1970 Germany............................ 2043520

[52] U.S. Cl............. 260/970, 204/162 R, 260/961
[51] Int. Cl. ............................................. C07f 9/40
[58] Field of Search................. 260/970; 204/162 R

[56] References Cited
UNITED STATES PATENTS
3,029,272   4/1962   Runge............................... 260/970

OTHER PUBLICATIONS
Kharasch, "Organic Sulfur Compounds," Vol. 1, Pergamon Press, New York, (1961), pp. 210–212.

*Primary Examiner*—Anton H. Sutto
*Attorney, Agent, or Firm*—Curtis, Morris & Safford

[57] ABSTRACT

The known production of alkane phosphonic acid diesters from olefins and dialkylphosphites in the presence of free radical generators is improved by using $\alpha$-olefins having an extremely low content of sulfur. Thus high yields and pure products are obtained within short reaction times. The known products are foam depressants, anticorrosives, oiladditives, dyeing adjuvants and organic intermediates, expecially for plant protecting agents.

9 Claims, No Drawings

PROCESS FOR THE MANUFACTURE OF ALKANE PHOSPHONIC ACID DIESTERS

The present invention relates to an improved process for the manufacture of alkane phosphonic acid diesters. According to the processes of U.S. Pat. Nos. 2,724,718 and 2,957,931, dialkyl phosphites may be added on α-olefines by means of free radical forming agents or ultraviolet radiation, while simultaneously alkane phosphonic acid diesters are formed. As is known from the literature, in these processes both the 1- and 2-isomers of the phosphonic acid esters are obtained as mixtures in moderate yields only (cf. Houben-Weyl, Methoden der organischen Chemie, (1963), Vol. 12/1, page 463):

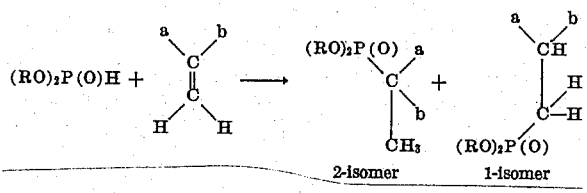

In the case of an addition by means of radical forming agents, the yields are slightly higher than in the case of ultraviolet radiation; however, the radical forming agents have to be used in considerable amounts generally of from about 10 to 20 mol%. Further, the known processes require a very long reaction time of generally at least 15 hours up to more than 50 hours in some cases. In order to obtain relatively satisfactory yields, it is also necessary to use the dialkyl phosphites in a high excess in order to exclude the formation of telomerisates as far as possible. In spite of this measure, there is still formation of telomerisates to a non-negligible extent, so that a following work-up by distillation has to be carried out in case the pure alkane phosphonic acid diesters are to be obtained.

Surprisingly, it has now been found that the aforementioned difficulties can be completely avoided and that, in a very simple and non-expensive manner, alkane phosphonic acid diesters of the general formula

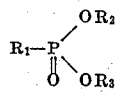

in which $R_1$ represents an alkyl group having from two to 22 carbon atoms and $R_2$ and $R_3$ each stand for alkyl groups having from one to 22 carbon atoms, may be obtained without formation of telomers in a considerably shorter reaction time and in a substantially quantitative yield by reacting dialkyl phosphites of the general formula

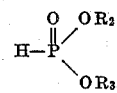

in which $R_2$ and $R_3$ are as defined above, with sulfur-free or nearly sulfur-free α-mono-olefines in the presence of free radical forming agents and/or ultraviolet radiation, at a temperature of from 130° to 250°C, preferably of from 150° to 195°C.

Further, it is a surprising fact that in the process of the invention the 1-isomers of the alkane phosphonic acid diesters are formed in a rate of at least 95 percent, while the 2-isomers are either not formed at all or only to an insignificant extent.

It is especially surprising that the reaction of the dialkyl phosphites also with α-olefines containing less than 4 carbon atoms, i.e., with ethylene and propylene, results in high yields of the corresponding alkane phosphonic acid diesters, since in U.S. Pat. No. 2,478,390 it is described that in the addition reaction of ethylene on diethyl phosphite at 80°–115°C using dibenzoyl-peroxide as catalyst, the desired ethane-phosphonic acid diethyl ester is obtained in a yield of only 41.5 percent, while the remaining part consists of higher boiling telomerisates. Further, it is surprising that in case propylene is used in the process of the invention, the propane-phosphonic acid diesters consist of at least 95 percent of the n-propane derivatives, while the iso-propane-phosphonic acid derivatives are either not formed at all or to an insignificant extent.

The dialkyl phosphites used as starting substances in the process of the invention are easily obtainable according to known methods. Dialkyl phosphites of a chain length of more than 5 carbon atoms are advantageously prepared according to the method of Belgian Pat. No. 747,353, since the phosphites obtained in this process are extremely pure. The following dialkyl phosphites for example may be used: dimethyl phosphite, diethyl phosphite, di-isopropyl phosphite, di-n-butyl phosphite, di-isobutyl phosphite, di-n-hexyl phosphite, di-2-ethyl-hexyl phosphite, di-n-heptyl phosphite, decyl-isobutyl phosphite, propyl-tetradecyl phosphite, di-octadecyl phosphite, di-eicosyl phosphite and di-docosyl phosphite.

The α-olefines used in the process of the invention contain from two to 22 carbon atoms, preferably from two to 12 carbon atoms. In the process of the invention, besides straight-chain α-mono-olefines also branched α-mono-olefines may be used. Examples of such olefines are: ethylene, propene, butene-(1), hexene-(1), octene-(1), dodecene-(1), tetradecene-(1), hexadecene-(1), octadecene-(1), heneicosene-(1), docosene-(1), 2-methyl-pentene-(1) and 2-ethyl-hexene-(1). Also mixtures of such olefines may be used.

As decisive criterion for a success of the process of the invention it is required that the α-mono-olefine to be used must be substantially free of sulfur or at least nearly free of sulfur, i.e., its sulfur content must be below 0.002 percent, as surprisingly was found out, sulfur amounts of only about 0.02 percent result in considerably lower yields.

Especially ethylene and propylene have to be sulfur-free or nearly sulfur-free. Advantageously, they are used in a purity degree as required for a successful polymerization according to the known Ziegler process.

Advantageously, those higher olefines are used in the process of the invention which are sulfur-free from the start on account of their manufacturing process. Such a process is for example the so-called Ziegler or Mulheim process, in which ethylene is dimerized or oligomerized into straight-chain α-olefines in the presence of catalysts, especially aluminum triethyl. According to the same process, also branched α-olefines, for example 2-methyl-pentene-(1) and 2-ethyl-hexene-(1) may be prepared, by dimerization, for example, of propene or isobutylene (cf. F. Asinger, "Chemie und Technologie der Monoolefine" (1957), especially pages 178–180). The dimerization may be also carried out in a different manner, for example by catalysis by means of alkali metals. Of course, also such α-olefines may be used as starting compounds which are obtained in other known processes, for example by cracking of petroleum distillates or waxes, by splitting off hydrochloric acid from paraffins with terminal chlorine atoms of by dehydration of alcohols with a terminal hydroxy group.

The only important factor is their being sulfur-free or substantially sulfur-free. Otherwise, the sulfur has to be eliminated completely or nearly completely by means of appropriate measures, for example by catalytic desulfuration.

As free radical forming agents in the process of the invention all known radical forming substances may be used, for example: di-tert.-butylperoxide, tert.-butylperbenzoate, 2,5-dimethyl-bis-2,5-(peroxybenzoate), tert.-butylhydroperoxide, dicumylperoxide and benzoylperoxide.

The radical forming agents are dissolved in the reaction component(s) which is (are) introduced dropwise into the reaction vessel. It may be necessary to add an inert solvent as dissolving agent; for example in the case of dodecene-(1) being added dropwise to a dialkyl phosphite and benzoylperoxide being used as radical forming agent, a dissolving agent has to be used, since benzoylperoxide is not sufficiently soluble in dodecene-(1). In this special case, benzene may be used as inert solvent.

The radical forming agent may also be insoluble in the olefine but soluble in the dialkyl phosphite. In this case that part of the total dialkyl phosphite in which the radical forming agent is dissolved may be introduced separately besides the olefine. Further, also the dialkyl phosphite may possibly be used as solution promoter for the radical forming agent in the olefine.

The radical forming agents are used in catalytic amounts, advantageously of from 0.1 to 2 mol percent, preferably of from 0.5 to 1.2 mol percent, calculated on the amount of olefine used. Advantageously, di-tert.-butylperoxide is used.

In case the reaction is started by ultraviolet radiation, the reaction solution has to be exposed to direct radiation by an ultraviolet lamp.

The reaction with gaseous olefines according to the invention is advantageously carried out as follows: the olefine is fed, while stirring vigorously, into the dialkyl phosphite at the same rate as it is absorbed. Advantageously, dialkyl phosphite and olefine are used in a molar ratio of about 1:1. It is also possible to use an excess of one of the reaction components, but there is no advantage in doing so. It is not necessary to use pressure.

The reaction according to the invention with liquid olefines is advantageously carried out as follows: The olefine, optionally mixed with catalytic amounts of a radical forming agent, is introduced dropwise into the dialkyl phosphite; lower boiling olefines being advantageously added dropwise in such a manner that the outlet tube of the dropping funnel ends below the surface of the dialkyl phosphite. Advantageously, dialkyl phosphite and olefine are used in a molar ratio of about 1:1. It is also possible to use an excess of one of the reaction components, but there is generally no advantage in doing so when using radical forming agents. Only in case the reaction is carried out by means of ultraviolet radiation, an excess of dialkyl phosphite is advantageous in a molar ratio of 2–3 mols of dialkyl phosphite to about 1 mol of olefine.

The reaction may also be carried out in the presence of inert solvents, for example of alcohols, esters or hydrocarbons, such as benzene. However, generally it is advantageous to work in the absence of solvents.

The reaction may also be carried out in an inert gas atmosphere, using for example argon or nitrogen. Also the olefine used in the reaction may serve as protective gas in case it is present in its gaseous form under the reaction conditions.

The reaction time of the process of the invention is considerably shorter than that of the known processes, i.e. generally from about 1 to 3 hours, in most cases from about 1 to 2 hours. Only when using ultraviolet radiation, it is advantageous to extend the reaction time to 5 to 8 hours in order to obtain high yields.

The reaction is practically quantitative. The alkane phosphonic acid diesters formed may be purified by recrystallization or distillation, optionally under reduced pressure. In contrast to the indications in the literature, at least 95 percent of the terminal phosphonic acid diesters are obtained. In their pure form they are obtained in most cases in a more than 90 percent yield. In case the purification is carried out by means of distillation, and in case stoichiometric amounts are used in the reaction, the starting compounds are obtained in amounts below 5 mol percent of the amounts originally used, if there are any remains at all. The distillation residues are mixtures of the alkane phosphonic acid monoesters and the alkane phosphonic acids of the alkane phosphonic acid diesters obtained, and they do not contain any telomerization products. It is easy to understand why the alkane phosphonic acid monoesters and the alkane phosphonic acids are obtained in negligible amounts, for it is known that phosphonic acid diesters are split into these substances at elevated temperatures; further, the presence of radicals during the reaction seems to accentuate this tendency of splitting. Thus, the reaction results in a yield of more than 95 percent of the alkane phosphonic acid derivatives corresponding to the olefine used.

The process may also be carried out continuously.

The products obtained in the process of the invention are known compounds. In case the phosphonic acids or the ester chlorides are to be prepared, the crude products may be directly subjected to hydrolysis in order to obtain the corresponding alkane phosphonic acids and, optionally, to the transformation to the acid chlorides, since a substantially quantitative reaction has occurred in a manner as desired and since neither a distillation of the reaction products for the separation of the desired products from the undesired ones formed by telomerization nor an elimination of non-reacted starting substances is necessary.

The alkane phosphonic acid esters may be used as dyeing auxiliaries, as anti-foaming agents (cf. U.S. Pat. No. 2,792,374), as extraction agents for salts of uranium and of transuranic elements, as corrosion inhibitors and oil additives. Further, they are valuable intermediate products; the ethane and propane phosphonic acid esters obtained in the process of the invention for example are technically and commercially very important intermediates in the plant protection field. It is known that, by reaction with phosgene at room temperature, these esters yield alkane phosphonic acid ester chlorides which are important starting compounds for renowned plant protecting agents. Up to now, ethane phosphonic acid di-ethyl ester for example could be obtained from tri-ethyl phosphite also by rearrangement according to Arbusov. However, triethyl phosphite as starting substance can be obtained only by more difficult and more expensive methods than diethyl phosphite.

The process of the invention represents a considerable technical advance, since in contrast to known processes, in this process commercially and technically important alkane phosphonic acid esters or the alkane phosphonic acids are obtained in a substantially simplified manner and in considerably higher yields.

The following examples illustrate the invention.

EXAMPLE 1

278 g of di-n-heptyl-phosphite were heated to 160°C under a blanket of pure nitrogen. 84 g of hexene-(1), mixed with 2.5 g of di-tert.-butylperoxide, were added dropwise within 1.5 hours; the outlet tube of the dropping funnel being led below the surface of the di-n-heptyl phosphite. During the reaction, the temperature was maintained at 165°–170°C. After completed reaction, stirring was continued for another 15 minutes. Subsequently, the distillation was carried out under reduced pressure. At a transition temperature of 168°C and at 0.4 torr, 327 g of hexane-phosphonic acid di-n-heptyl ester, corresponding to a yield of 90.5 percent, were obtained.

EXAMPLE 2

276 g of diethyl phosphite were heated to 170°–180°C under a blanket of pure nitrogen. 225 g of octene-(1), mixed with 2 g of di-tert.-butylperoxide, were added dropwise, while vigorously stirring, within 2 hours; the outlet tube of the dropping funnel being led below the surface of the mixture. After this addition has been made, stirring was continued for another 30 minutes. In the final distillation, at a transition temperature of 112°C and at 0.5 torr, 488 g of octanephosphonic acid diethyl ester, corresponding to a yield of 97 percent, were obtained.

In the same process, when using 220 g of dimethyl phosphite instead of diethyl phosphite, at a reaction temperature of 165°C, 398 g of octane-phosphonic acid dimethyl ester, boiling point at a pressure of 0.01 mm mercury (0.01 torr): 98–99°C, were obtained (yield 90 percent).

In case 388 g of di-isobutyl phosphite were used instead of diethyl phosphite, in the same process, at a reaction temperature of 165°C, 564 g of octane-phosphonic acid di-isobutyl ester, boiling point at 0.1 torr: 128°C, were obtained (92 percent yield).

In case 612 g of di-2-ethyl-hexyl phosphite were used instead of diethyl phosphite, in the same process 795 g of octane phosphonic acid di-2-ethyl-hexyl ester, boiling point at 0.3 torr: 175–180°C, were obtained (95 percent yield).

EXAMPLE 3

276 g of diethyl phosphite were heated to 150°–160°C under a blanket of pure nitrogen, subsequently 336 g of dodecene-(1), mixed with 3 g of di-tert.-butylperoxide, were added dropwise within 3 hours. Stirring was then continued for another 30 minutes. In the following distillation, at a transition temperature of 152°–153°C and at 0.3 torr, 555 g of dodecane-phosphonic acid diethyl ester, corresponding to a 90 percent yield, were obtained. The distillation residue (31 g) was a mixture of dodecane-phosphonic acid monoester and dodecane-phosphonic acid (about 5 percent of the theoretical yield).

EXAMPLE 4

175 g of dodecene-(1) were added dropwise, under ultraviolet radiation, at 192°C to 288 g of diethyl phosphite within 7 hours. Subsequently, stirring was continued at this temperature. In the following distillation, after fractionation of the excess diethyl phosphite, at a transition temperature of about 150°C and at 0.3 torr, 300 g of dodecane-phosphonic acid diethyl ester, corresponding to a yield of 93.5 percent, calculated on the dodecene-(1) used, were obtained.

EXAMPLE 5

388.5 g of di-n-butyl phosphite were heated to 160°C under a blanket of pure nitrogen. 392 g of tetradecene-(1), mixed with 4 g of di-tert.-butylperoxide, were added dropwise, while stirring vigorously, within 4 hours. Stirring was continued for another 30 minutes at this temperature. In the following distillation, at a transition temperature of 205°–208°C and at 0.4 – 0.5 torr, 690 g of tetradecane-phosphonic acid dibutyl ester, corresponding to a 88 percent yield, were obtained.

The distillation residue amounted to 65 g. It was boiled with concentrated hydrochloric acid. Then a distillation was carried out in an aspirator vacuum. The residue was recrystallized from cyclohexane. Thus, the tetradecane-phosphonic acid was obtained (calc. 11.1 percent, found 10.9/11.2 percent P).

In the same process, when using 220 g of dimethyl phosphite instead of dibutyl phosphite, tetradecane phosphonic acid dimethyl ester, boiling point at 0.4 torr: 160°–162°C, melting point 30°–31°C, was obtained. (89 percent yield).

EXAMPLE 6

220 g of dimethyl phosphite were heated to 160°C under a blanket of pure nitrogen. Subsequently, 448 g of hexadecene-(1), mixed with 4 g of di-tert.-butylperoxide, were added dropwise, while vigorously stirring, within 4 hours. Stirring was continued for 30 minutes at this temperature. In the following distillation, at a transition temperature of 180°–183°C and at 0.1 torr, 589 g of hexadecane-phosphonic acid dimethyl ester, melting point 40°C, were obtained. (88.5 percent yield). The distillation residue amounted to 46 g (about 7 percent).

In the same process, when using 276 g of diethyl phosphite instead of dimethyl phosphite, hexadecane-phosphonic acid diethyl ester, boiling point at 0.1 torr: 175°C, was obtained. (95 percent).

In the same process, when using 388 g of di-n-butyl phosphite instead of dimethyl phosphite, 778 g of hexadecane-phosphonic acid dibutyl ester, boiling point at 0.3 torr: 195°–200°C, were obtained. (93 percent yield).

Comparative Example:

220 g of dimethyl phosphite were heated to 160°C under a blanket of pure nitrogen. 406 g of a mixture of tetradecene-(1) and pentadecene-(1), obtained in a cracking process and having a sulfur content of 0.02 percent, mixed with 4 g of ditert.-butylperoxide, were added dropwise, while stirring vigorously, within 4 hours. Stirring was continued at this temperature for another 30 minutes. In the following distillation, at a transition temperature of 170°–176°C and at 0.3 torr, 213 g of a mixture of tetra- and pentadecane-phosphonic acid dimethyl ester, corresponding to a yield of only 34 percent, were obtained. Further, 160 g of distillation residue were obtained which consisted mostly of tetra- and pentadecane-phosphonic acid monoethyl ester and tetra- and pentadecane-phosphonic acid.

EXAMPLE 7

168 g of 2-methylpentene-(1) and 4 g of di-tert.-butyl-peroxide were added dropwise, under a blanket of pure nitrogen, to 276 g of diethyl phosphite at 170°–180°C within 5 hours; the outlet tube of the dropping funnel being led below the surface of the diethyl phosphite. After complete reaction, the distillation was carried out. At a transition temperature of 70°C and at 0.35 torr, 390 g of 2-methylpentane-phosphonic acid diethyl ester, corresponding to a yield of 88 percent, were obtained.

EXAMPLE 8

145 g of di-[4-methylpentyl-(2)]-phosphite were heated to 155°C under a blanket of pure nitrogen. 49 g of hexene-(1), mixed with 1.5 g of di-tert.-butylperoxide, were added dropwise within 1.5 hours, the outlet tube of the dropping funnel being led below the surface of the di-[4-methylpentyl-(2)]-phosphite. After complete reaction, 192 g of crude hexane-phosphonic acid di-[4-methylpentyl-(2)]-ester, corresponding to a yield of 99 percent, were obtained. In a following distillation, the pure diester could be obtained having a boiling point at 0.5 torr of 115°C.

EXAMPLE 9

300 g of di-n-hexadecyl phosphite were heated to 160°C under a blanket of pure nitrogen. 47.5 g of hexene-(1), mixed with 1.7 g of di-tert.-butylperoxide, were added dropwise within 1.5 hours, the outlet tube of the dropping funnel being led below the surface of the di-n-hexadecyl phosphite. The temperature was maintained at 165°–175°C during the reaction. After complete reaction, stirring was continued for another 15 minutes. 345 g of crude hexane-phosphonic acid di-n-hexadecyl ester, corresponding with a 100 percent yield, were obtained.

Example 10

276 g of diethyl phosphite were heated to 170°–180°C under a blanket of pure nitrogen, and a mixture of 4 g of di-tert.-butylperoxide and 225 g of 2,4,4-trimethylpentene-(1) were added dropwise, while stirring vigorously, within 3 hours, the outlet tube of the dropping funnel being led below the surface of the mixture. Stirring was then continued for another 30 minutes. In the following distillation, 451 g of 2,4,4-trimethylpentane-phosphonic acid diethyl ester, corresponding to a 90 percent yield, were obtained at a transition temperature of 102°C and at 1.4 torr.

EXAMPLE 11

100 g of di-isopropyl phosphite were heated to 150°–160°C under a blanket of pure nitrogen, and 152 g of octadecene-(1), mixed with 1 g of di-tert.-butylperoxide, were added dropwise, while stirring vigorously, within 1.5 hours. Stirring was continued at this temperature for another 30 minutes. Subsequently, the reaction product was distilled at 225°C and 0.6 torr in a rotary evaporator. 242 g of octadecane-phosphonic acid di-isopropyl ester, melting point about 30°C, were obtained, which corresponded to a 96 percent yield.

EXAMPLE 12

At 158°–160°C and under a nitrogen blanket, ethylene was introduced into 500 g of dimethyl phosphite, while stirring vigorously, within 4.5 hours at the same rate as it was absorbed, while a mixture of 25 g of dimethyl phosphite and 2.5 g of di-tert.-butylperoxide was added dropwise. Subsequently, the distillation was carried out. 646 g of ethane-phosphonic acid dimethyl ester, boiling point at 30 torr: 90°C, corresponding to a 98.5 percent yield, were obtained.

EXAMPLE 13

At 170°C, and under a nitrogen blanket, ethylene was introduced into 500 g of diethyl phosphite, while stirring vigorously, within 2 hours at the same rate as it was absorbed, while a mixture of 20 g of diethyl phosphite and 2 g of ditert.-butyl-peroxide was added dropwise. Subsequently, the distillation was carried out. 597.5 g of ethane-phosphonic acid diethyl ester in a 95.5 percent yield were obtained.

EXAMPLE 14

At 180°–185°C and under a nitrogen blanket, ethylene was introduced into 555 g of di-isobutyl phosphite, while stirring vigorously, within 3 hours at the same rate as it was absorbed, while a mixture of 14 g of di-isobutyl phosphite and 4 g of di-tert.-butyl-peroxide was added dropwise. Subsequently, the distillation was carried out. 628 g of ethane-phosphonic acid di-isobutyl ester corresponding to a 96.5 percent yield, were obtained.

EXAMPLE 15

At 170°–180°C and under a nitrogen blanket, propylene was introduced into 500 g of diethyl phosphite, while stirring vigorously, within 2 hours at the same rate as it was absorbed, while a mixture of 17 g of diethyl phosphite and 2 g of ditert.-butyl-peroxide was added dropwise. Subsequently, the distillation was carried out. 633 g of propane-phosphonic acid diethyl ester, boiling point at 0.5 torr: 50°C, were obtained. (94 percent yield).

EXAMPLE 16

At 175°–180°C, and under a nitrogen blanket, ethylene was introduced into 500 g of di-n-decyl phosphite, while stirring vigorously, within 30 minutes at the same rate as it was absorbed, while a mixture of 23 g of di-n-decyl phosphite and 2 g of di-tert.-butylperoxide was added dropwise. 565 g of ethane-phosphonic acid didecyl ester (100 percent yield) were obtained.

EXAMPLE 17

300 g of di-isobutyl phosphite were heated to 180°–190°C under a nitrogen blanket, and isobutylene was introduced, while vigorously stirring, at the same rate as it was absorbed, while a mixture of 30 g of di-isobutyl phosphite and 3 g of di-tert.-butylperoxide was added dropwise. After 2 hours, the reaction was complete. The distillation was then carried out. 362 g of 2-methylpropane-phosphonic acid di-isobutyl ester (94 percent yield) were obtained.

We claim:

1. In a process for the preparation of a compound of the formula

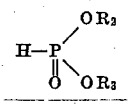

in which $R_1$ is alkyl of two to 22 carbon atoms and $R_2$ and $R_3$ are alkyl of one to 22 carbon atoms from a dialkylphosphite of the formula

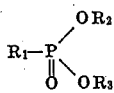

in which $R_2$ and $R_3$ are as defined above, and an α-monoalkene of two to 22 carbon atoms in the presence of a free-radical generator, the improvement comprising reacting α-monoalkenes of 2 to 22 carbon atoms containing less than about 0.002 percent by weight of sulfur with said dialkylphosphites at a temperature of about 130° to about 250°C.

2. The process as claimed in claim 1, wherein the temperature range is from about 150° to about 195°C.

3. The process as claimed in claim 1, wherein said free-radical generator is a peroxide or UV light irradiation.

4. The process as claimed in claim 1, wherein the free-radical generator is an organic peroxide.

5. The process as claimed in claim 1, wherein the free-radical generator is di-tert.-butyl peroxide.

6. The process as claimed in claim 1, wherein the reaction is performed in an inert gas environment.

7. The process as claimed in claim 1, wherein the reactants are used in about stoichiometrical amounts.

8. The process as claimed in claim 1, wherein the free-radical generator is an organic peroxide which is used in a molar amount of 0.1 to 2 percent, referred to α-monoalkene.

9. The process as claimed in claim 1, wherein the free-radical generator is an organic peroxide which is used in a molar amount of 0.5 to 1.2 percent, referred to α-monoalkene.

* * * * *